United States Patent [19]
Chiba et al.

[11] 3,818,252
[45] June 18, 1974

[54] UNIVERSAL LOGICAL INTEGRATED CIRCUIT

[75] Inventors: Tsuneyo Chiba; Akira Masaki, both of Kadaira, Japan

[73] Assignee: Hitachi, Ltd., Tokyo, Japan

[22] Filed: Dec. 20, 1972

[21] Appl. No.: 316,898

[30] Foreign Application Priority Data

Dec. 20, 1971 Japan .............................. 46-102721
Jan. 21, 1972 Japan .............................. 47-7621

[52] U.S. Cl. ............. 307/303, 307/207, 317/234 V, 340/173 SP
[51] Int. Cl.... H03k 19/08, H03k 19/20, H011 19/00
[58] Field of Search ........ 317/234 V; 307/303, 207, 307/252 E; 340/166 R, 173 SP

[56] References Cited

UNITED STATES PATENTS

| | | | |
|---|---|---|---|
| 3,295,031 | 12/1966 | Schmitz | 307/303 X |
| 3,378,920 | 4/1968 | Cone | 29/625 |
| 3,384,879 | 5/1968 | Stahl et al. | 340/173 |
| 3,500,148 | 3/1970 | Gunther et al. | 307/303 |
| 3,525,083 | 8/1970 | Slob et al. | 307/303 X |
| 3,560,940 | 2/1971 | Gaensslen | 307/303 X |
| 3,566,153 | 2/1971 | Spencer | 307/304 |
| 3,584,183 | 6/1971 | Chiaretta et al. | 219/121 |
| 3,634,927 | 1/1972 | Neale et al. | 29/576 |
| 3,634,929 | 1/1972 | Yoshida et al. | 29/577 |
| 3,699,543 | 10/1972 | Neale | 307/303 |

*Primary Examiner*—Rudolph V. Rolinec
*Assistant Examiner*—William D. Larkins
*Attorney, Agent, or Firm*—Craig & Antonelli

[57] ABSTRACT

A universal logical integrated circuit comprises a plurality of word lines crossing a plurality of digit lines driven by input variables, and fixed memory elements installed at individual cross-points of the word and digit lines, the memory contents of the memory elements being programmable, whereby a desired function is realized.

8 Claims, 14 Drawing Figures

FIG. 3
PRIOR ART
| | | C | $\bar{C}$ |
|---|---|---|---|
| A | B | 1 | 0 |
| | $\bar{B}$ | 1 | 1 |
| $\bar{A}$ | B | 0 | 0 |
| | $\bar{B}$ | 0 | 1 |
FIG. 4a
PRIOR ART
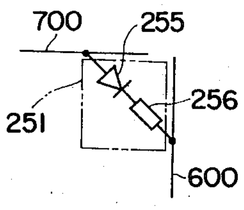
FIG. 4b
PRIOR ART
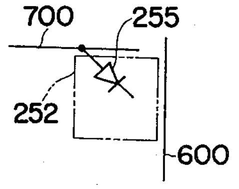
FIG. 5
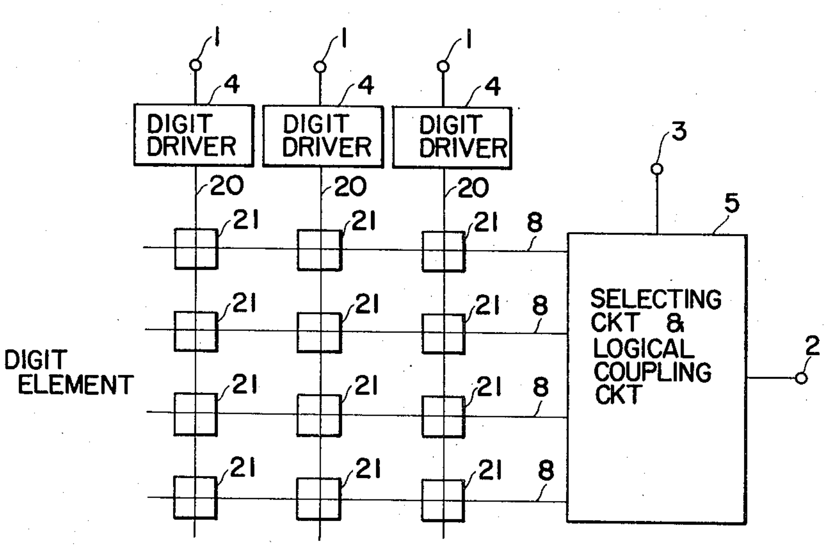
FIG. 6
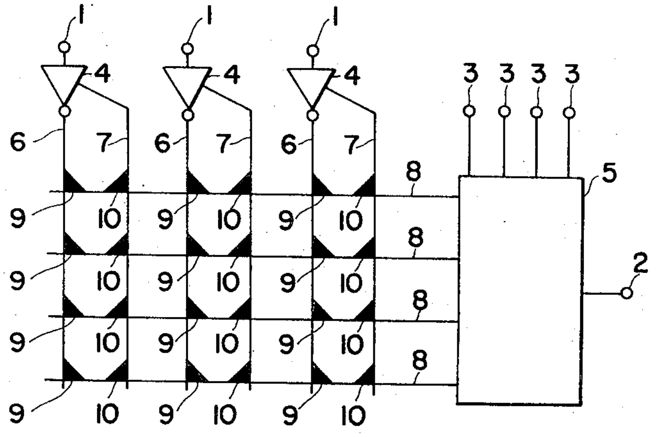

UNIVERSAL LOGICAL INTEGRATED CIRCUIT

BACKGROUND OF THE INVENTION

1. Field of the Invention

The present invention relates to logical circuits and, more particularly, to universal logical integrated circuits.

2. Description of the Prior Art

With the development of semiconductor IC techniques, the integration of logical circuits used for digital electronic equipment such as electronic computers has been accelerated of late. These integrated circuits are essentially used for data processing logic and data processing control logic. In spite of the fact that semiconductor IC techniques have achieved a high level of development, the integration of control logical circuits, especially those intended for large data processors, is still quite insufficient. To give an account of this prior art, the following factors are considered.

1. The control logical circuit is so intricate that it is difficult to split it into divisions for use as universal logical blocks which may be repeatedly used.
2. Even though large logical blocks are integrated into one circuit, this integrated circuit is lacking in versatility and is costly to manufacture.
3. If the logic is complicated, design error tends to occur at a high rate. Furthermore, the higher the integration, the more often the circuit should be redesigned, and the higher will become the cost of production.

To solve these problems in the art, universal logical circuits have been proposed to replace the complicated logical circuits which have been in use. This type of universal logical circuit should possess various logic functions to meet a wide range of applications.

The concept of this universal logical circuit is based on the fundamental formulae of Boolean algebra in which a certain Boolean function is expressed by the sum of the miniterm of input variables or by the product of the maxterm. Hence, to obtain the desired versatility, all the miniterms or all the maxterms are prepared, of which the necessary miniterms or maxterms are used for the function required. One example of the prior art universal logical circuit is one in which all the miniterms of input variables are set up with a number of logical AND circuits, and the control input signal to the individual logical circuits is used to control whether to use or ignore the miniterms.

Another prior art circuit employs decoders and fixed memory elements in place of the AND circuits, and the outputs of the decoders are used to determine the miniterms of input variables and, thus, the contents of the memory elements are used to determine whether to adopt or ignore the miniterms.

These two universal logical circuits are advantageous in that impurity diffusion process and part of the wiring are fundamentally in common in the production of semiconductor logical integrated circuits even if the kind of the circuits required is broadly varied. However, which miniterms should be used is determined by the pattern of wiring metalization in part of the production process, with the result that different logical integrated circuits should be manufactured if design is modified. Furthermore, many maintenance parts are required for this type of logical circuit.

Recently, the universal logical circuit using fixed memory elements on which the memory contents are programmable has been proposed. This logical circuit makes a large number of functions available by the use of a substantially small number of integrated circuits, and is especially suited for integrated circuits of intricate logic.

In this universal logical circuit, however, the necessary number of memory elements is as large as $2^N$ bits when the number of input variables is N which, in turn, needs a suitable number of decoders to drive $2^N$ numbers of memory elements.

In the universal logical circuit using AND circuits, $2^N$ numbers of AND circuits are also required.

Generally, the logical circuit used in the control part has 10 to 20 numbers of input variables. Suppose the number of input variables (N) is 10, then $2^N$ becomes 1,024 numbers. In other words, more than 1,000 fixed memory elements and decoders, or AND circuits, are required, resulting in high cost. Because of such a high cost, this logical circuit can hardly be used for general logic control applications.

SUMMARY OF THE INVENTION

A principal object of the present invention is to provide a universal logical integrated circuit manufacturable at a very low cost.

Another object of the invention is to provide a simple and small-size universal logical integrated circuit.

Briefly, the universal logical integrated circuit of the present invention uses fixed memory elements on which the memory contents are programmable either permanently or semipermanently, thus making the memory elements possess associative functions.

BRIEF DESCRIPTION OF THE DRAWINGS

FIG. 3 is a diagram of a truth table for illustrating a logical operation;

Figure 2:
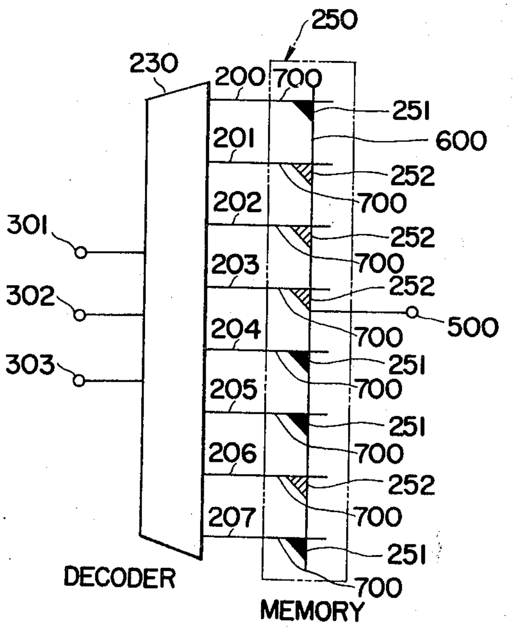
FIG. 2 PRIOR ART
FIG. 2 is a diagram showing a conventional universal logical circuit using memory elements.
Figure 7:
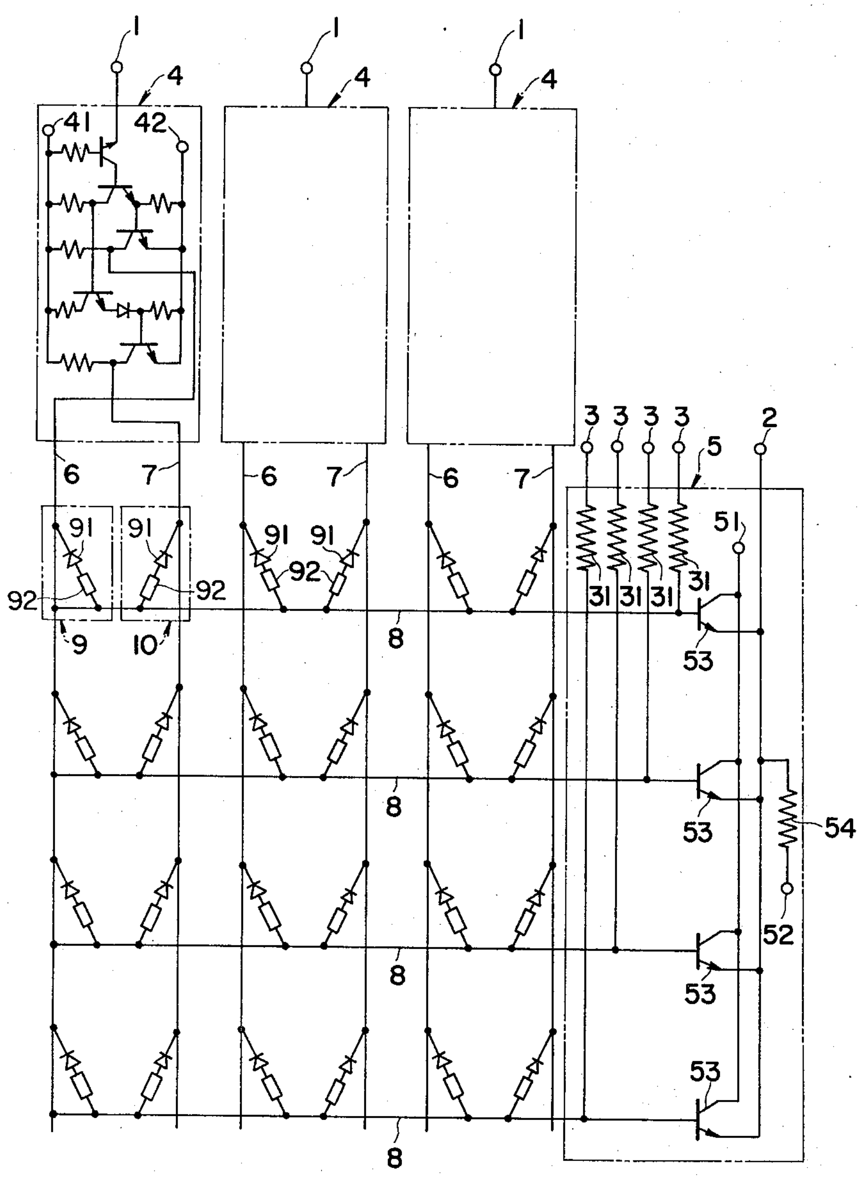
Figure 8:
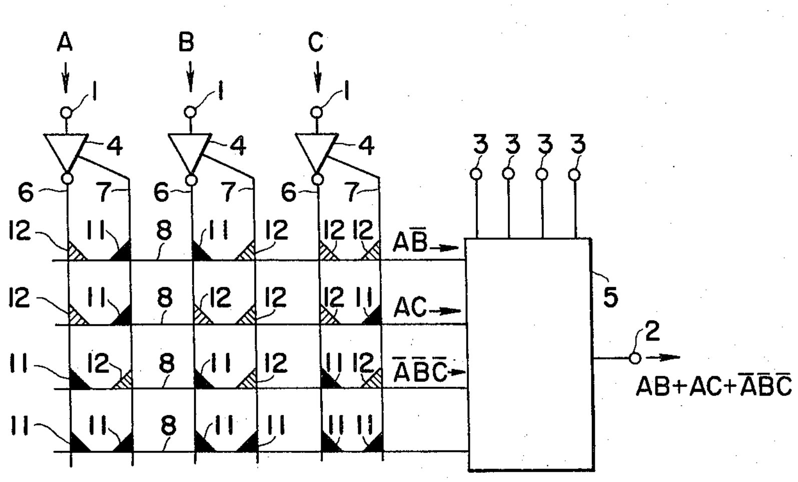
Figure 9:
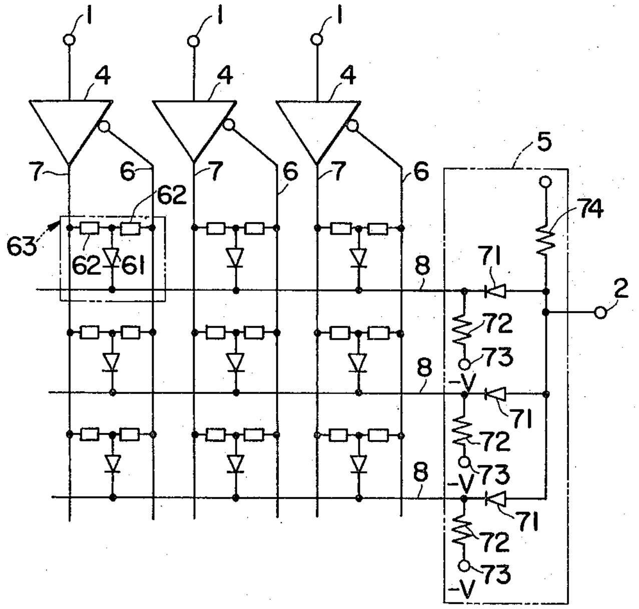
Figure 10:
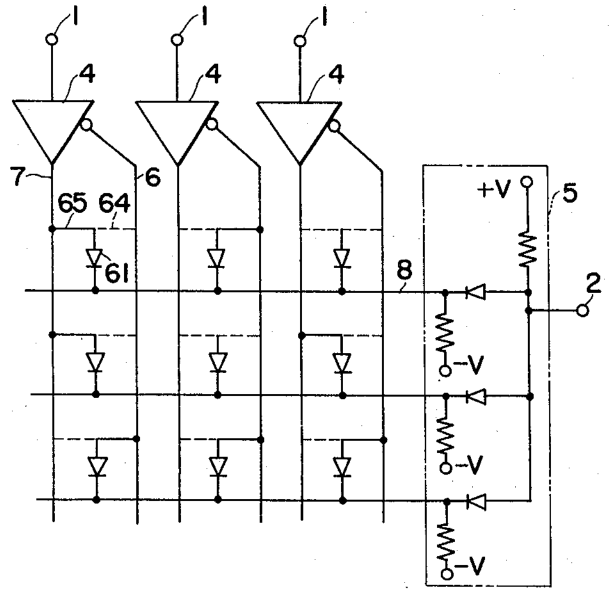
Figure 11:
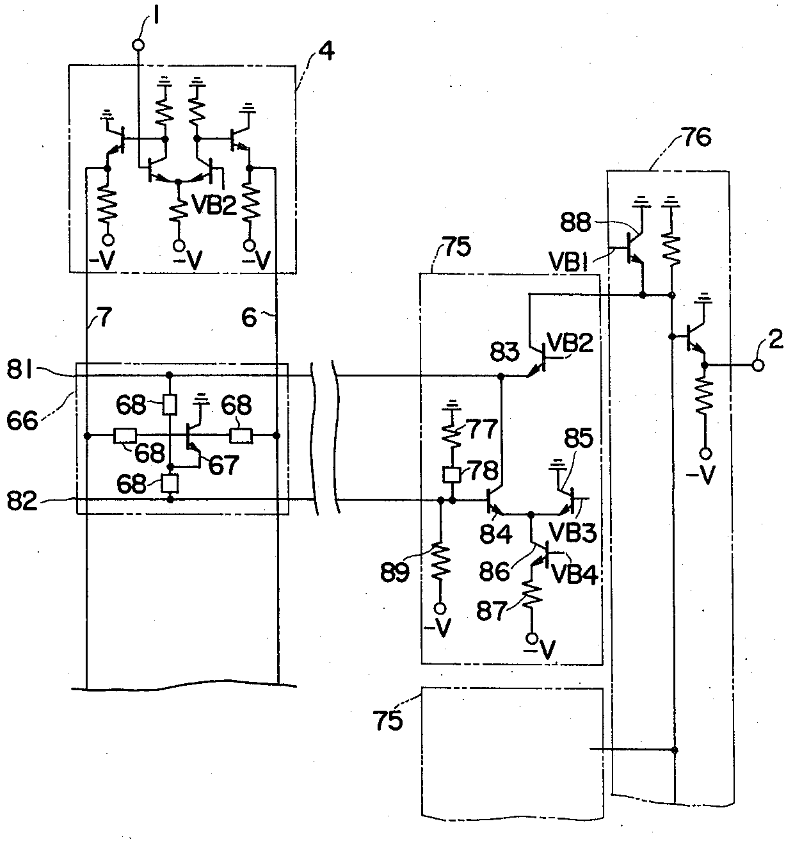
Figure 12:
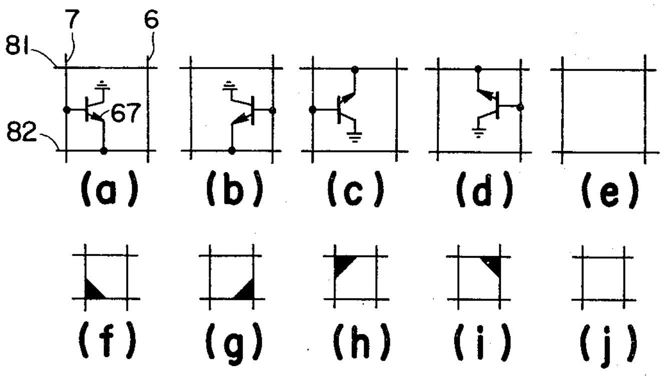
Figure 13:
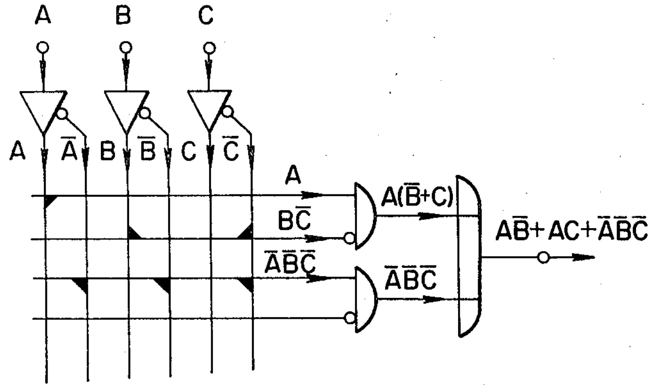

FIGS. *4a* and *4b* are diagrams showing concrete examples of the fixed memory element shown in FIG. 2;

FIG. 5 is a diagram showing a basic example of the universal logical circuit of the present invention;

FIG. 6 is a diagram showing a concrete example of the circuit shown in FIG. 5;

FIG. 7 is a circuit diagram showing details in connection with FIG. 6;

FIG. 8 is a diagram showing a state of memory contents programmed on the fixed memory elements of FIG. 6;

FIG. 9 is a diagram of another universal logical circuit of this invention;

FIG. 10 is a diagram of memory contents programmed on the memory elements shown in FIG. 9;

FIG. 11 is a circuit diagram of another embodiment of the invention;

FIG. 12 illustrates the states of memory contents programmed on the memory elements (*a*)–(*e*) and their equivalent states (*f*)–(*g*); and FIG. 13 is a diagram of a state of programmed memory contents of FIG. 11 shown in terms of equivalent coupling.

DESCRIPTION OF THE PREFERRED EMBODIMENT

Figure 1:
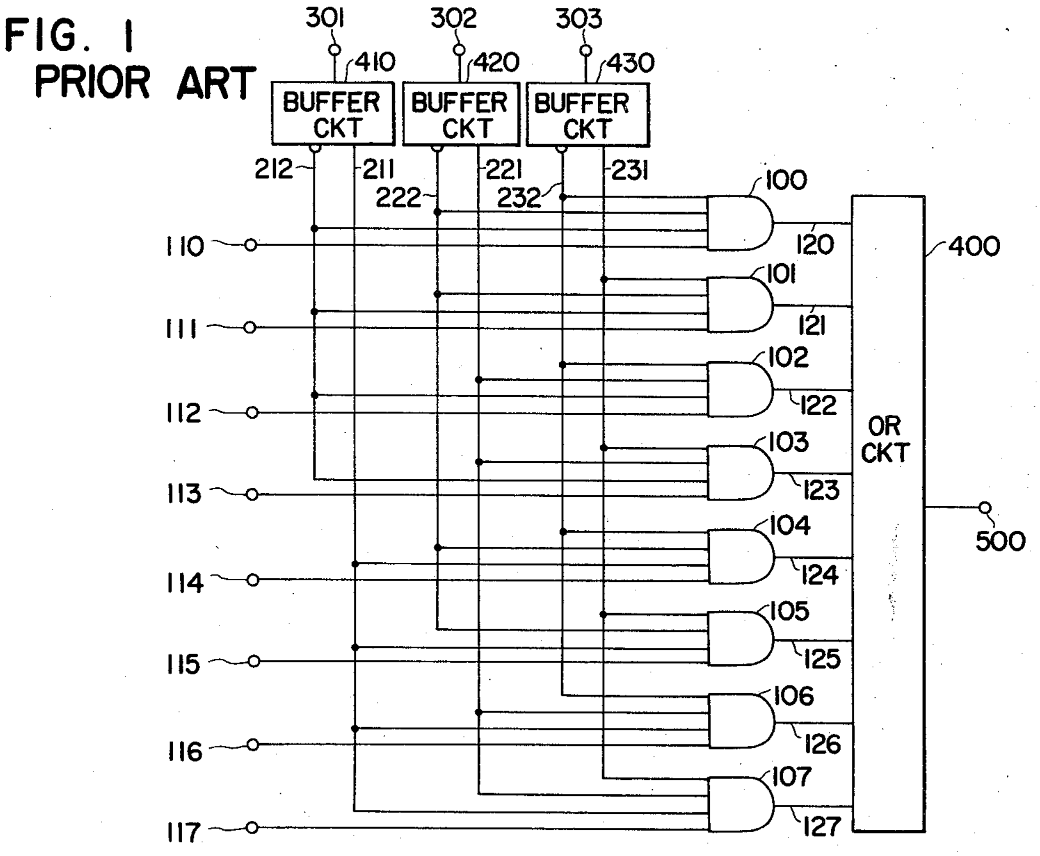
FIG. 1 PRIOR ART
FIG. 1 is a diagram showing a conventional universal logical circuit.

FIGS. 1 and 2 illustrate examples of a conventional universal logical circuit in which a Boolean function for the input variable is expressed by the sum of miniterms. Three input variables are shown for explanatory simplicity.

Referring to FIG. 1, the numerals 301, 302 and 303 represent input terminals of variables, and 410, 420 and 430 buffer circuits for the input variables. These buffer circuits deliver the normal (positive) value of an input and the inverted (negative) value to output lines 211, 212, 221, 222, 231 and 232 respectively. The inputs of AND circuits 100 through 107 are fixedly connected to the output lines 211, 212, 221, 222, 231 and 232 of the buffer circuits 410, 420 and 430 and also to control terminals 110 through 117. The outputs 120 through 127 of the AND circuits 100 through 107 are connected to the inputs of an OR circuit 400.

In this arrangement, the AND circuits 100 through 107 realize all the miniterms of the variables given to the input terminals 301, 302 and 303. Whether to use or ignore the miniterms is controlled by the input to the control terminals 110 through 117, thus realizing the desired function. In other words, the output value corresponding to the input variable can be obtained from the output terminal 500. For example, the functions of input variables A, B and C determined by the truth table (FIG. 3) can be realized by giving a logic "1" to the control terminals 110, 114, 115 and 117, and "0" to the rest of control terminals 111, 112, 113 and 116.

FIG. 2 illustrates a prior art universal logical circuit in which fixed memory elements are used instead of the ordinary logical circuit elements as in FIG. 1. In FIG. 2, the numeral 230 denotes a decoder, and 250 a fixed memory part. The variables given to input terminals 301, 302 and 303 are considered to designate the address of the fixed memory part 250, and the contents of the designated address are read out to an output terminal 500.

The outputs 200 through 207 of the decoder 230 give the miniterms of the input variables, and the contents of the fixed memory part 250 determine whether to use or ignore the miniterms. Thus, by changing the contents of the fixed memory part 250, the desired function can be obtained. The functions determined by the truth table of FIG. 3 are realized by storing a logical "1" in a fixed memory element 251 which is designated by the outputs 200, 204, 205 and 207 of the decoder 230, and a "0" in another memory element 252. Note that FIG. 2 shows the state that these logic values have already been stored. The blacked out portion indicates the memory element which stores "1," and the portion with oblique lines the memory element which stores "0."

In these universal logical integrated circuits, which miniterms should be used is determined by the pattern of wiring metalization in part of the production process, and hence different logical integrated circuits should be manufactured if design is modified. Furthermore, many maintenance parts are required.

To solve these problems, a programmable fixed memory element as shown in FIG. 4*a* has been proposed for use in place of the fixed memory element of FIG. 2.

Referring to FIG. 4*a*, a line 700 is connected to either one of the outputs 200 through 207 of the decoder 230 of FIG. 2, and an output line 600 of the memory element is connected to the output terminal 500 of FIG. 2. The numeral 256 denotes a metal wire, such as nichrome wire, which melts when a current above a certain limit value passes through it.

In the state of memory element 251, the metal wire 256 does not melt as shown in FIG. 4*a*, but connects between the lines 700 and 600 via a diode 255. This means that the element is storing a logical "1." While, in the state of memory element 252, the metal wire 256 breaks, as shown in FIG. 4*b*, and the memory element stores "0." In other words, "1" or "0" to be stored in the memory element depends on whether the metal wire 256 remains unmelted or is melted. First a logical "1" is stored in all the memory elements, and then the metal wire corresponding to the memory element in which the logic "0" is to be stored is melted when necessary.

In the universal logical circuit constituted of such programmable fixed memory elements, a number of functions can be realized with a substantially small number of kinds of integrated circuits. Hence, this circuit concept is useful, especially when intricate logic circuits are to be built up into an integrated circuit. Practically, however, this prior art circuit has not been in general use because of the following drawbacks.

When the number of input variables is N, the number of necessary memory elements is $2^N$ bits and, accordingly, a suitable number of decoder circuits and drive circuits to drive $2^N$ numbers of words become necessary. In FIG. 1, for example, a certain number of gates are required to form $2^N$ numbers of AND logics. When N is 10, then $2^N$ is about 1,000 (i.e., 1,024). While, in ordinary digital electronic equipment, 50 to 100 numbers of gates are used even if the number of input variables is as large as 10. This is why the prior art universal logical circuit needs a great number of circuit elements as a whole.

Generally, the number of input variables of the logical circuit used in the control part, etc. of an electronic computer is 10 to 20, or a large number of circuit elements must be used in the prior art.

Referring to FIG. 5, there is shown an example of the fundamental arrangement of a universal logical circuit of the present invention. In this example, three input variables are used for explanatory simplicity. In FIG. 5, the numeral 1 denotes a terminal to which a digit pattern to be programmed is applied when a program is plotted, or which is used as an associative input terminal to which the logical variable input is applied as an associative input after the programming. The numeral 20 denotes a digit line comprising at least one wire, and 4 a drive circuit by which the data given to the terminal 1 is supplied to the digit line 20. The numeral 8 represents a word line. A programmable digit element 21 is formed at the cross-point of the digit line 20 and the word line 8. The numeral 5 is a circuit as a selection circuit for providing the selected word with a write condition in the case of programming, or as a logical coupling circuit of the associative output of the word line 8 after programming. The numeral 3 is a terminal used when selecting the word for programming, and 2 is an output terminal for the associative output. This universal logical circuit is operated in the following manner.

Referring to FIG. 6, there is shown a universal logical circuit of the invention in which one digit is constituted of two bits of programmable digit elements. This is the state present before programming. In FIG. 6, 4 denotes a drive circuit by which the normal (positive) value and the inverted (negative) value of the data given to the terminal 1 are applied complementarily to the digit lines 6 and 7. The numerals 9 and 10 are programmable digit elements respectively.

FIG. 7 illustrates an example of the concrete universal logical circuit in connection with FIG. 6. In FIG. 7, a programmable digit element is made up of a diode 91 and a metal wire 92. A method of establishing a logical circuit for obtaining a function given on the truth table shown in FIG. 3 will be described below.

The function F on the truth table (FIG. 3) will be expressed as follows.

$$F = ABC + A\bar{B}C + A\bar{B}C + A\bar{B}C$$

Simplifying this function, $$F = A\bar{B} + AC + \overline{ABC}$$

When programming, the individual miniterm on the right term of the above expression is assigned to each word. The memory contents of a pair of digit elements 9 and 10 corresponding to the variables contained in the miniterms in the form of "true," i.e., in the form of A, B and C, are made to equal "0, 1." At the same time, the memory contents of a pair of digit elements 9 and 10 corresponding to the variables contained therein in the form of "false," i.e., in the form of $\bar{A}$, $\bar{B}$ and $\bar{C}$ are made to equal "1, 0." Then, also, the memory contents of a pair of digit elements 9 and 10 corresponding to the variables not contained in the miniterms are made to equal "0, 0." Further, the memory contents of a pair of digit elements 9 and 10 of the words which are the remainder after the miniterms are assigned to the individual words are made to equal "1, 1," or held in the state present before programming. In practice, it is necessary to change one or both of the digit elements 9 and 10 into the "0" state. For this reason, it is necessary to melt the metal wire 92.

When the specific digit element 9 or 10 comprising a diode 91 and a metal wire 92 is desired to be programmed into the "0" state, a certain definite operating voltage is applied from the terminal 3 to the word line 8 through the resistor 31, which word line 8 is connected to the digit elements 9 and 10 and at the same time a certain definite voltage is applied to the terminal 1 so that a current may flow into the circuit 4 via the digit line 6 or 7 which is connected to the digit element. In this case, a certain voltage is applied also to the terminals 41 and 42. A certain cut-off voltage is applied so as not to allow a current to flow into the terminal 3 connected to the word line 8. At the same time, a certain cut-off voltage is applied to the terminals 51 and 2 so that no current can flow into the base of a transistor 53. Also, a definite cut-off voltage is applied to the terminals 1, 41 and 42 of the circuit 4 connected to other digit element pair so that no current can flow into other digit element pair connected to the word line 8 where the program is made.

The drive circuit 4 consists essentially of an ordinary transistor-transistor logic (TTL). The description of operation of this circuit is omitted for the sake of brevity. The above-mentioned operating voltage depends on the current necessary to melt the metal wire 92. For example, when the resistance of the metal wire 92 is 50Ω, the melting current is 200mA, and the resistance of the resistor 31 is 200Ω, the operating voltage applied to the terminal 3 should be 50V.

A series of the foregoing operations is performed as often as is the number of necessary digit elements for "0." In FIG. 8, for example, the foregoing operation is to be repeated 11 times to obtain the logical circuit in the state after programming.

In FIG. 8, the digit elements 11 and 12 are in the "1" and "0" states of the memory contents. When an input "1" (or a high level input) is applied to the terminal 1 of the programmed logical circuit, the digit line 7 will stand at a high level, i.e., "1," and the digit line 6 will stand at a low level, i.e., "0." These levels are reversed at the digit lines 6 and 7 when an input "0" (or a low level input) is applied to the terminal 1.

When even one digit element of a "1" state is present at the cross-point of the word line 8 and the digit line of the "0" state, the potential at the word line 8 is lowered by the current flowing through the digit element and resistor 31, to cause the word line 8 to deliver a "0" output. Only if the digit elements present at the cross-points of the word lines 8 and the digit lines of a "0" state are all in the "0" state, will a "1" output be generated at the word line 8. The output signals generated at the individual word lines are applied to an OR logic circuit through an emitter follower comprising a transistor 53 as shown in FIG. 7. The resultant output is delivered at the terminal 2.

When the digit element pairs in "0, 1," "1, 0," "0, 0" and "1, 1" are considered to be digits having the values "1," "0," "X" and "Y," then "X" has the effect so that the variable input to the corresponding digit does not affect the word line output, or such input variable may logically be ignored. "Y" causes the word line 8 to generate a "0" output regardless of whether the value of the variable input to the corresponding digit is "1" or "0" and, hence, the word containing the digit "Y" may logically be ignored. Thus, an output "1" is generated only at the word having digit patterns "1" and "0" being coincident with the values of a pair of variables supplied to the input terminal 1, and the digit corresponding to the negligible one of such variables is "X." This output "1" is derived from the terminal 2.

A method of providing "Y" as a digit pattern for the remainder word after programming has been described above. Another method is such that the digit patterns exactly the same as those of other words are programmed.

In the above example, one digit is constituted of two bits of elements. It is apparent that the invention is not limited to this example.

By arranging the logical circuit as above, the necessary number of words is reduced to the number of the main terms of the function. Generally, the number of main terms is about the same as the number N of input variables. Therefore the number of fixed memory elements is roughly $2N^2$.

In the above example, three input variables are used for the sake of explanation. Generally, the number of input variables is 10 to 20. If it is 10, for example, the necessary number of memory elements is about 200.

Whereas, in the conventional universal logical circuit, $\mathbf{2}^N$ number of memory elements are required. If the number of input variables is 10, the necessary number of memory elements is more than 1,000.

According to the invention, therefore, the necessary number of elements can be markedly reduced and thus inexpensive and large scale logical circuits can be realized.

FIG. 9 illustrates another universal logical circuit of this invention.

The embodiments as in FIGS. 5 through 8 have certain drawbacks. Namely, the integration density is lowered because the necessary number of word selection terminals is equal to the number of words of the memory device for the purpose of word selection for programming. In addition, the applicable peak voltage for the elements is strictly limited because a large voltage or current is to be applied at programming. The embodiment as in FIG. 9 is for solving these problems. In this logical circuit, the connection and disconnection between the digit element, digit line and word line are effected by energy given without using external terminals.

In FIG. 9, the numeral 1 denotes an input terminal, 4 a drive circuit, 6 and 7 a pair of digit lines, 8 a word line, 5 an output circuit, and 2 an output terminal. A digit element comprising a diode 61 and two junction parts 62 is installed at the cross-point of the word line 8 and digit lines 6 and 7. The junction part 62 is constituted, for example, of an amorphous semiconductor. This amorphous semiconductor is a glassy material obtained by the process that a mixture comprising one or more of selenium (Sl), arsenide (As), tellurium (Te), silicon (Si), germanium (Ge) and the like, is heated to a high temperature and melted, and then is quickly cooled down. This glassy semiconductor changes its electrical conductivity to a great extent by irradiating it with radiant rays such as visible rays, ultraviolet rays, infrared rays, laser beams, microwaves, electron beams and X rays. In other words, this junction part can be turned into two states, alternately, between a high resistance state and a low resistance state. The junction part 62 usually has a very high resistance, or is substantially an insulator. This amorphous semiconductor turns into a crystal semiconductor when it receives from an external device a certain amount of radiant energy. By this, the junction part loses its resistance to become substantially a conductor. This low resistance state remains unchanged even after the removal of the application of radiant energy. Therefore, the desired memory data can be programmed when a specific one of the junction parts 62 is selectively exposed to an adequate amount of radiant energy according to the information to be programmed.

The output circuit 5 consists essentially of a diode 71, resistors 72 and 74, and a power terminal 73, thus functioning as an OR circuit.

FIG. 10 illustrates a state after programming wherein a function given according to the truth table of FIG. 3 is realized. In FIG. 10, the numeral 64 indicates the junction part which remains in a high resistance state to be considered substantially as an insulator, and 65 the junction part in a low resistance state to be considered substantially as a conductor. This means that the circuit of FIG. 10 is functionally the same as the circuits as in FIGS. 5 through 8 when it is used to read operation. As described above, the associative memory type logical circuit as in FIGS. 9 and 10 does not require programming word selection terminals as do the circuits of FIGS. 5 through 8. Furthermore, the circuit as in FIGS. 9 and 10 needs no large current no voltage for programming. Compared with the circuit of FIG. 7, the circuit as in FIGS. 9 and 10 can operate with half the number of diodes used as bit elements. In FIG. 7, the junction part shown in FIGS. 9 and 10 may be used in place of the metal wire 92 of the fixed memory element, to which junction part suitable radiant rays are applied for connection or disconnection of the element.

FIG. 11 illustrates part of another embodiment of the invention. In this embodiment, a transistor is used instead of a diode as the digit element, and a current switching type logical circuit is used as a principal circuit element. In addition, one word is formed on two word lines. These are the points different from the arrangement shown in FIG. 9. In FIG. 11, the numeral 1 denotes an input terminal, 4 a drive circuit made up in the form of current switching type switch circuit, 6 and 7 a pair of digit lines, 81 and 82 a pair of word lines, 66 a digit element comprising a transistor 67 and four junction parts 68, 75 a circuit for logically coupling the outputs appearing at the word lines 81 and 82, and 76 a circuit for logically coupling the outputs of the circuits 75 and causing the output terminal 2 to provide an output. The purpose of the resistor 77 and the junction part 78 added to each word line 82 is to set a suitable operating condition for the circuit 75, as will further be described below. The junction parts 68 and 78 are constituted of a substance which can assume two states alternately, between a high resistance state and a low resistance state, as in the case of junction part 62 of FIG. 9. Further operating features of this logical circuit will be described below in connection with its method of programming.

In FIG. 11, the junction part 78 remains in a high resistance state either when at least one transistor 67 is substantially connected to the word line 82 through program, or when no transistors 67 are connected to the paired word lines 81 and 82. While, the junction part 78 is programmed to stay in a low resistance state when at least one transistor 67 is substantially connected to the word line 81, and no transistors are connected to the word line 82. Either one of the two junction parts 68 connected to the base of the transistor 67 assumes a low resistance state according to the information to be programmed, or both of the two remain in a high resistance state. Either one of the two junction parts 68 connected to the emitter of the transistor 67 assumes a low resistance state according to the information to be programmed, when one of the two junction parts 68 connected to the base of the transistor 68 assumes a low resistance state. While, when both of the two junction parts connected to the base of the transistor remain in a high resistance state, the two junction parts connected to the emitter also stay in a high resistance state. Thus, after programming, the individual digits assume substantially any of five states as indicated by (*a*) through (*e*) in FIG. 12. In FIG. 12, the lines 6 and 7, and 81 and 82 correspond to the digit lines and word lines, respectively, of FIG. 11. Also, the state (*f*) through (*j*) are symbolic representations of (*a*) through (*e*) respectively.

After programming as above, the transistor 67 connected substantially to the word line 81 is combined with the transistor 83 of the circuit 75, to form a current switching type switch circuit. The transistor 67 connected substantially to the word line 82 forms an emitter follower circuit in which a plurality of transistors are incorporated. The output of the emitter follower circuit is supplied to the current switching type switch which comprises transistors 84 and 85 of the circuit 75. Thus the current from the current source comprising a transistor 86 and a resistor 87 is switched in a cascade manner by the two current switching type switches. As a result, a high level signal is delivered to the output terminal 2 only when no current is delivered from any circuit 75. When current is delivered from more than one circuit 75, a low level signal is generated at the output terminal 2.

The transistor 88 of the circuit 76 constitutes a known clamp circuit which allows the output signal to have substantially two signal levels and prevents the operating speed of the circuit from slowing down due to the saturation phenomenon.

When the state where the signal level is low is assumed to be a logical "1," and the state where the signal level is high is assumed to be a logical "0," the outputs of the individual digits are subjected to an AND logic operation on the word lines 81 and 82. On the other hand, the negative values of the outputs of word lines 81 and 82 are subjected to AND logics in the circuit 75. Further, in the circuit 76, the outputs of the circuits 75 go through an OR logic operation. These logic operations are similar to those performed in the known current switching type logical circuit. When no transistors 67 are connected substantially to the word line 82, the junction part 78 is placed in a low resistance state and, hence, the transistor 84 stays in a conducting state if a suitable voltage is applied to the base of the transistor 84 through the resistors 77 and 89. Therefore, the current switching type switch circuit comprising a transistor 83 and a transistor 67 which is substantially connected to the word line 81 can be effectively operated without interference. When the transistor 67 is not substantially connected to either word line 81 or 82, the junction part 78 stays in a high resistance state, to cause a sufficiently low voltage to be applied to the base of the transistor 84 through the resistor 89. By this, the transistor 84 cuts off, and no current is supplied to the circuit 76 from the circuit 75 connected to these word lines, irrespective of the information given to the input terminal 1. As a result, this word is substantially neglected.

FIG. 13 is a representation of the concept of the function F on the truth table of FIG. 3, in a programmed state realized by the device of FIG. 11. For the expression of the function F, the symbols of FIG. 12 are used. As shown by the following equation, the terms of $A\bar{B}$ and AC are combined to set up one word, thus reducing the necessary number of words. This advantage is great especially when a complicated function of several variables is desired.

$$F = A\bar{B} + AC + \overline{ABC}$$
$$= A(\bar{B} + C) + \overline{ABC}$$
$$= A \cdot B \cdot \bar{C} + \overline{ABC}$$

In the foregoing current switching type logical circuit, it is desirable to determine the peak voltage of the element to be low since the signal voltage is small and high operating speed is important. Therefore, it is not adequate to use a large current or a high voltage for programming which, in turn, requires intricate circuit design, as well as limitations on the characteristics of the elements used. Whereas the invention, as illustrated in FIGS. 9 through 13, eliminates these limitations and makes it possible to realize a functional memory device with intricate logical functions.

The amorphous semiconductor material used for the purpose of the invention can assume two states alternately, between a high resistance state and a low resistance state, as described above. It is to be noted that this amorphous semiconductor material can also be changed to a high resistance state from a low resistance state when it is given a suitable amount of energy. Because of this feature, it is easily possible to test the device or alternate the program when desired. This is one noteworthy advantage of the invention.

It is not always necessary to use the foregoing amorphous semiconductor materials for the junction part. Instead, any material which can assume two resistance states alternately, between a high resistance state and a low resistance state, when it is exposed to radiant energy may be used.

Also, instead of the foregoing junction part, a suitable semiconductor wire may be used. Such semiconductor wire is disconnected by the use of laser beam or the like.

What we claim is:

1. A universal logical integrated circuit comprising:

means for receiving a plurality of input variables;

a plurality of digit lines arranged in parallel with each other, each digit line comprising a pair of digit lines driven by the normal and inverted values of the input variables;

drive means for driving the digit lines by said input variables from said input means;

a plurality of word lines arranged crossing said digit lines, each of said word lines comprising a pair of word lines per word;

output means for logically combining the outputs of said word lines;

digit fixed memory means on which memory contents can be programmed, said digit fixed memory means being installed at the cross-points of said digit lines and said word lines, and comprising elements which are programmable by applying radiant ray energy to the elements, including a transistor with its collector grounded, and four junction parts which are connected between said digit line pair and the base of the transistor and between said word line pair and the emitter of the transistor and which can be disconnected by a program; and means for programming the memory contents of said digit fixed memory means, comprising means for applying radiant rays to said elements.

2. A universal logical integrated circuit comprising:

first means for receiving a plurality of input signals which are to be subjected to a prescribed logic operation;

second means, coupled to said first means, for effecting a selected operation of said input signals, said second means comprising a multiplicity of prescribed circuits, each circuit having a predetermined configuration and containing at least two individual components, the electrical characteristics of which are variable, so that each circuit element may have its components programmed to have preselected electrical characteristics, and wherein said second means further comprises a plurality of pairs of digit lines connected to said first means, to which said input signals and signals corresponding to the inverse polarity thereof are applied, a plurality of pairs of output word lines crossing said pairs of input lines and respective prescribed circuits each having a pair of input terminals connected to said digit lines and a pair of output terminals connected to said output word lines, with said individual components being disposed in the electrical circuit paths between said digit lines of each respective pair of digit lines and the output word lines of each respective pair of output word lines; and third means, coupled to said second means, for providing an output signal representative of the results of said prescribed logic operation on input signals applied to said first means, whereby, in response to the application of a programmed stimulus being applied to components included within the circuits of said second means, input signals applied to said first means will be logically combined in said second means in accordance with a prescribed operation determined by the electrical characteristics of the components of the circuits of said second means, to provide said output signal from said third means, and wherein said second means further comprises a plurality of logical coupling circuits each having a pair of inputs connected to respective pairs of said output word lines and an output connected to said third means, and further having an individual circuit component, the electrical characteristics of which are variable, connected to one of the inputs thereof.

3. A universal logical integrated circuit comprising:

first means for receiving a plurality of input signals which are to be subjected to a prescribed logic operation;

second means coupled to said first means, for effecting a selected logic operation on said input signals, said second means comprising a multiplicity of prescribed circuits, each circuit having a predetermined configuration and containing at least two individual components, the electrical characteristics of which are variable, so that each circuit element may have its components programmed to have preselected electrical characteristics, wherein said second means further comprises a plurality of pairs of digit lines connected to said first means, to which said input signals and signals corresponding to the inverse polarity thereof are applied, a plurality of pairs of output word lines crossing said pairs of input lines and respective prescribed circuits each having a pair of input terminals connected to said digit lines and a pair of output terminals connected to said output word lines, with said individual components being disposed in the electrical circuit paths between said digit lines of each respective pair of digit lines and the output word lines of each respective pair of output word lines, and wherein each prescribed circuit comprises first and second individual components, the electrical characteristics of which are variable, respectively connected to a pair of said digit lines, and third and fourth individual components, the electrical characteristics of which are variable, respectively connected to a pair of said output word lines, and a semiconductor switching element having an input electrode, an output electrode and a control electrode, said control electrode being connected to said first and second individual components, one of said input and output electrodes being connected to said third and fourth individual components, and the other of said input and output electrodes being connected to a reference potential input; and third means, coupled to said second means, for providing an output signal representative of the result of said prescribed logic operation on input signals applied to said first means, whereby, in response to the application of a programmed stimulus being applied to components included within the circuits of said second means, input signals applied to said first means will be logically combined in said second means in accordance with a prescribed operation determined by the electrical characteristics of the components of the circuits of said second means, to provide said output signal form said third means.

4. A universal logical integrated circuit according to claim 3, wherein said second means further comprises a plurality of logical coupling circuits each having a pair of inputs connected to respective pairs of said output word lines and an output connected to said third means, and further having an individual circuit component, the electrical characteristics of which are variable connected to one of the inputs thereof.

5. A universal logical integrated circuit according to claim 4, wherein each of said logical coupling circuits comprises a voltage divider network containing an individual circuit component, the electrical characteristics of which are variable, connected between respective terminals to which prescribed voltages are coupled, said individual component of said network being connected to one of the inputs, a first transistor, the base of which is connected to said one input, the emitter of which is connected to a controlled current supply circuit for supplying a controlled current input thereto, and the collector of which is connected to the other input of said pair of inputs, and further including a second transistor, the emitter of which is connected to said other input, the collector of which is connected to the output of the logical coupling circuit and the base of which is connected to a controlled reference potential input.

6. A universal logical intregrated circuit according to claim 5, wherein said third means includes a clamp circuit connected to each output from said logical coupling circuits of said second means.

7. A universal logical integrated circuit according to claim 3, wherein each of said semiconductor switching elements comprises a transistor and each of said first, second, third, and fourth individual components comprises an amorphous semiconductor material capable of exhibiting relatively high and low resistance states.

8. A universal logical integrated circuit according to claim 3, wherein each of said semiconductor switching elements comprises a transistor and said individual components each comprises a fusible semiconductor wire.

* * * * *